United States Patent [19]
Miszczak

[11] Patent Number: 5,454,397
[45] Date of Patent: Oct. 3, 1995

[54] REED VALVE ASSEMBLY AND GAS COMPRESSOR INCORPORATING SAME

[75] Inventor: Frank L. Miszczak, Frankfort, Ill.

[73] Assignee: Fel-Pro Incorporated, Skokie, Ill.

[21] Appl. No.: 287,171

[22] Filed: Aug. 8, 1994

[51] Int. Cl.[6] .................................................. F16K 15/16
[52] U.S. Cl. .................... 137/512; 137/512.15; 137/855; 137/856; 417/571
[58] Field of Search .................... 137/512, 512.15, 137/855–858; 417/571

[56] References Cited

U.S. PATENT DOCUMENTS

| | | | |
|---|---|---|---|
| 4,696,263 | 9/1987 | Boyesen | 137/855 X |
| 5,186,475 | 2/1993 | Kawai | 137/856 X |
| 5,265,646 | 11/1993 | Richardson | 137/856 |

Primary Examiner—Robert G. Nilson
Attorney, Agent, or Firm—Laff, Whitesel, Conte & Saret, Ltd.

[57] ABSTRACT

A valve assembly for a compressor or the like having improved sealing and noise reduction characteristics. A reed valve is provided with a gasketing layer, such as expanded graphite, which confronts the orifice plate. One reed valve plate also incorporates an integral, formed limiter portion to reduce the number of parts requiring assembly.

15 Claims, 3 Drawing Sheets

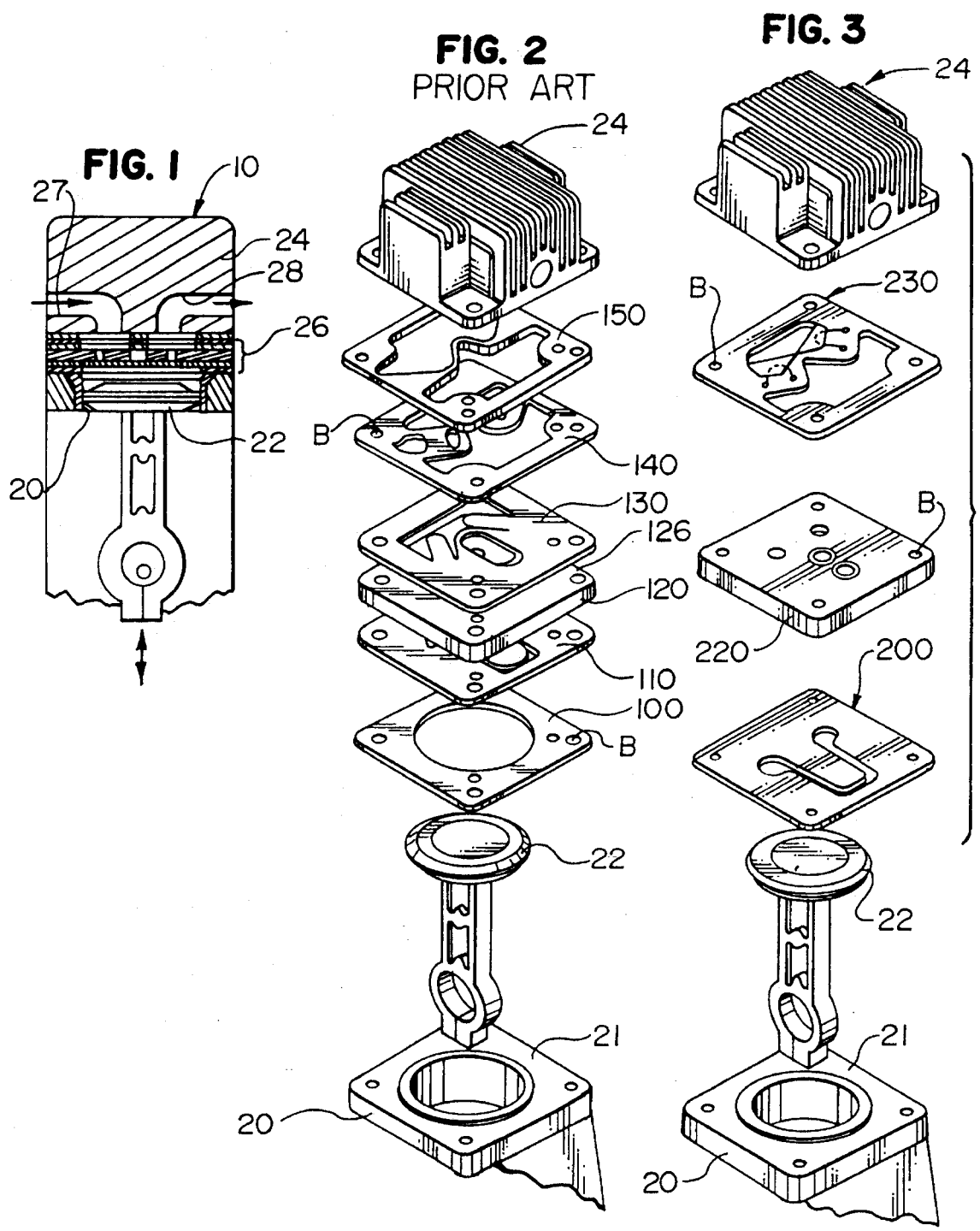

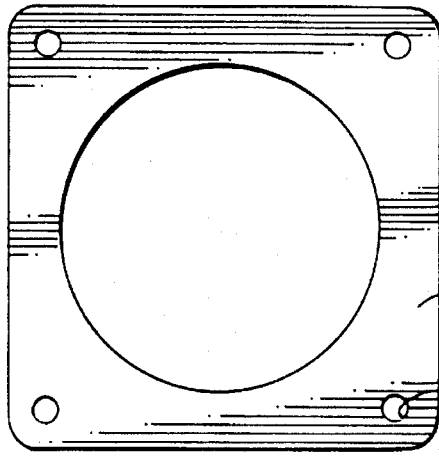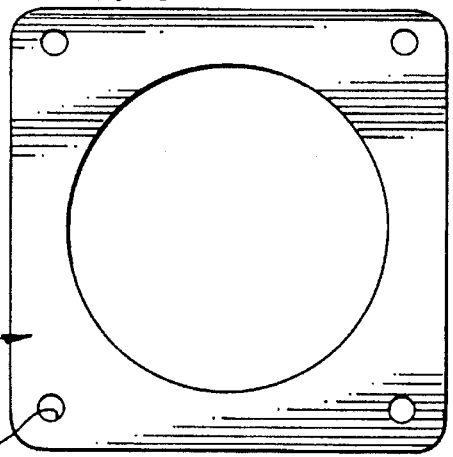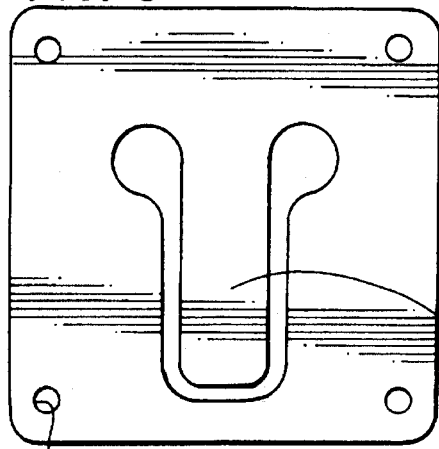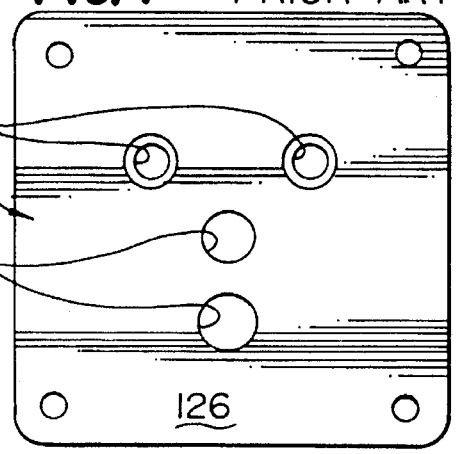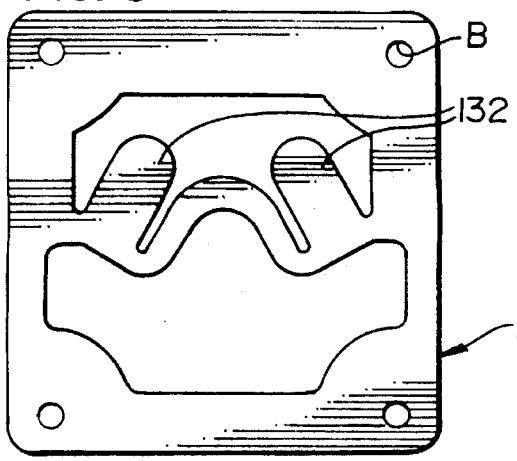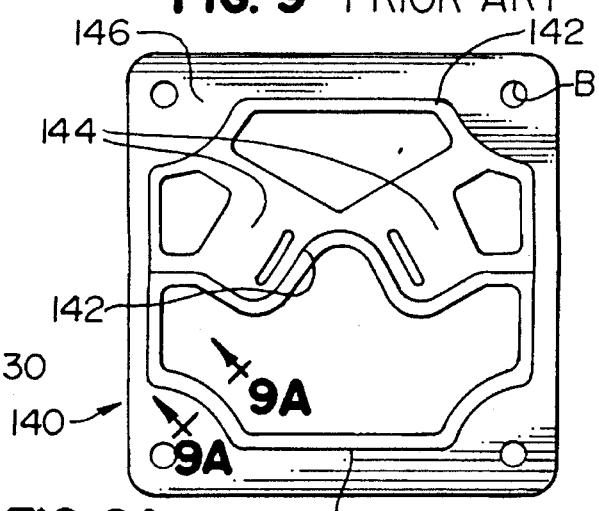

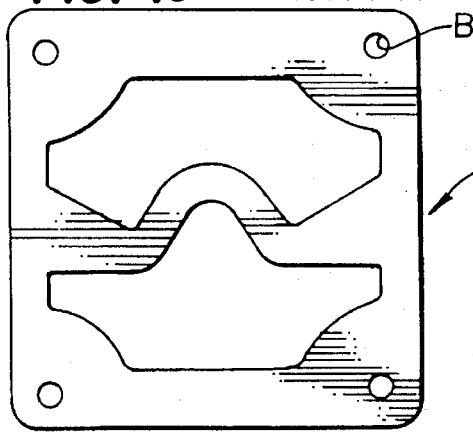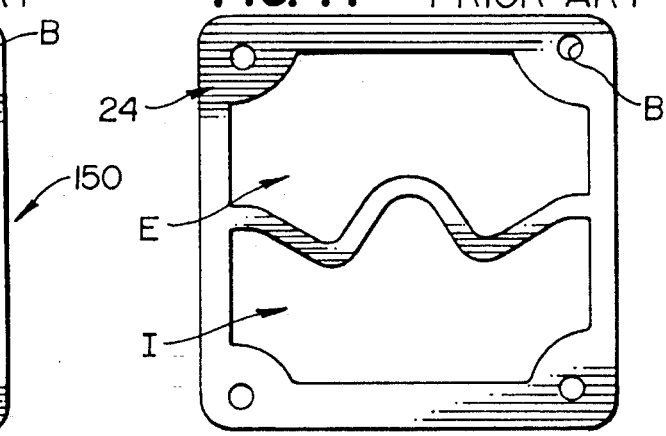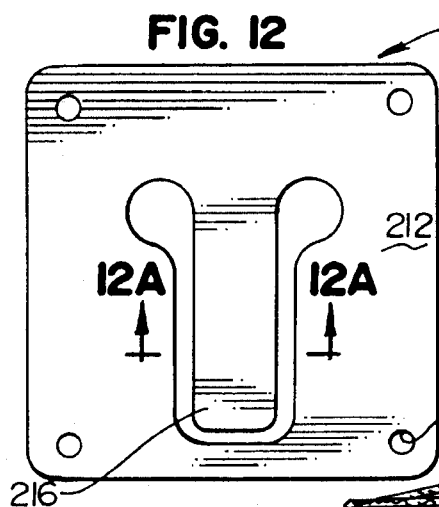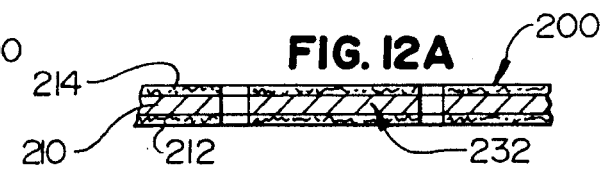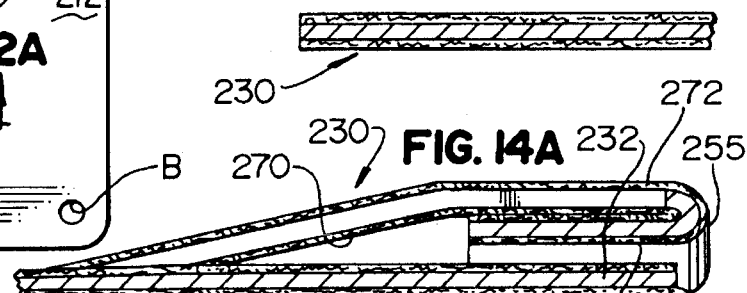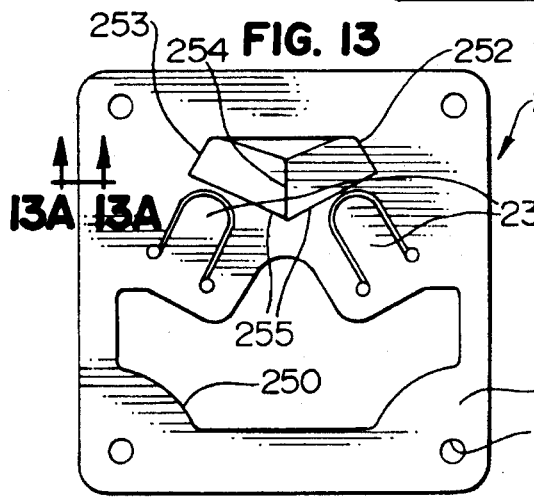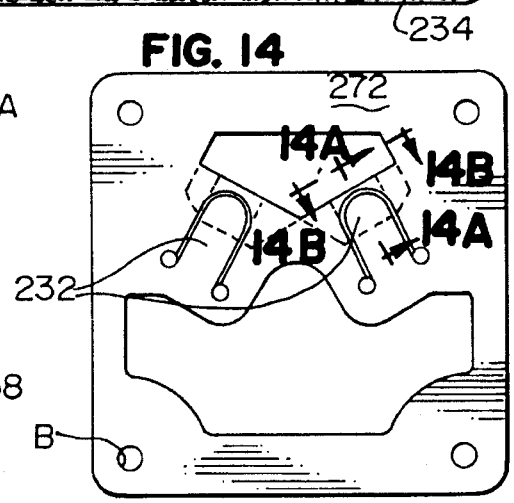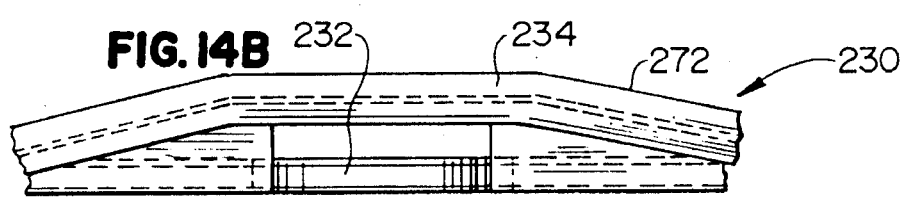

5,454,397

REED VALVE ASSEMBLY AND GAS COMPRESSOR INCORPORATING SAME

BACKGROUND OF THE INVENTION

Reed valves are widely used in gas and air compressors and other like devices. In air compressors, reed valves are used to admit air to, and to exhaust compressed air from, a cylinder during the intake and exhaust strokes, respectively of the compressor. During the compression and exhaust strokes, the intake must be sealed. During air intake the exhaust must be sealed. Reed valves function satisfactorily for these purposes.

Air compressor intake and exhaust valve assemblies also typically require gaskets for sealing to the head and to the cylinder, as well as limiters for limiting the displacement of the reeds as they open and close.

A typical intake and exhaust valve assembly sealed to the head and the cylinder of an air compressor includes a head gasket, a limiter plate, an exhaust valve with reeds, an orifice plate, an intake valve with a reed and a cylinder gasket. It would be desirable to provide a better seal between the valves and the orifice plate, as well as limit the number of these elements. This would simplify assembly, reduce cost and assure consistent and correct assembly of the parts, as well as provide a sealing and valving assembly that operates in a improved manner. Other systems recess O-rings in orifice plates to seal with reed valves and sometimes directly secure reeds to the surface of an orifice plate rather than using reed valve plates per se.

SUMMARY OF THE INVENTION

In accordance with the present invention, an improved valve and sealing assembly and air compressor are provided. A valve assembly comprises an expansive, generally flat orifice plate defining an aperture passing therethrough, a confronting expansive, generally flat reed valve plate lying generally in a single plane and defining a reed formed at one end with the reed valve plate and having a free end, the free end being moveable into and out of the plane of the reed valve plate and toward and away from the orifice plate to open and close the orifice in the orifice plate, and a gasketing layer laminated to the reed valve plate for providing a seal. In one form the gasketing layer confronts the orifice plate to seal against the orifice plate and to reduce the noise produced by contact of the reed with the orifice plate. The valve assembly desirably is disposed in a compressor between a compressor head and a compressor cylinder.

In another form the gasketing layer faces away from the orifice plate and seals against one of the compressor head and the compressor cylinder. In a most preferred form a gasketing layer is laminated to each of the expansive surfaces of the reed valve plate, the reed valve plate is an exhaust valve plate, and the gasketing layer is laminated to the expansive surface of the reed valve plate which confronts the compressor head. In a further preferred form the reed valve plate defines a limiter portion integral therewith which overlies the reed to limit movement of the free end of the reed out of the plane of the reed valve plate. The limiter is desirably integrally formed with the reed valve plate and may be folded relative to the main body of the reed valve plate to overlie and to be spaced from the free end. The main body may define one or more reeds formed with the reed valve plate and being joined to the plate at one end of each reed, with each reed having a free end, and a limiter overlying each reed free end, with each limiter being integrally formed with the reed valve plate and being folded relative to the reed valve plate to overlie its associated free end.

The sealing and valve assembly is especially applicable to an air compressor having a head and a cylinder and a sealing and valving assembly therebetween, in which the sealing and valve assembly comprises an expansive, generally flat orifice plate defining orifices passing therethrough and having two major surfaces, an expansive, generally flat reed valve plate confronting one of the major surfaces of the orifice plate and lying generally in a single plane, and defining a reed formed at one end with the reed valve plate and having a free end, the free end being moveable into and out of the plane of the reed valve plate and toward and away from the orifice plate to open and close an orifice in the orifice plate, and a generally flat second reed valve plate confronting the other of the major surfaces and defining an integral second reed having a free end moveable into and out of the plane of the second reed valve plate to open and close a second orifice in the orifice plate, and a gasketing layer laminated to one of the first and second reed valve plates for providing a seal against one of the cylinder and the head. The second reed valve plate preferably defines an integral formed limiter portion overlying the second reed for limiting the distance the free end of the second reed may move out of the plane of the second reed valve plate and away from the orifice plate. Desirably a second gasketing layer is laminated to the other of the first and second reed valve plates for providing a seal against the other of the cylinder and the head. In one form a further gasketing layer is laminated to a major surface of one of the reed valve plates which confronts a major surface of the orifice plate.

Further objects, features and advantages of the present invention will become apparent from the following description and drawings.

BRIEF DESCRIPTION OF THE DRAWINGS

FIG. 1 is a schematic, fragmentary view of a typical single stage air compressor having a sealing and valving assembly in accordance with the present invention;

FIG. 2 is an exploded perspective view of the sealing and valving assembly of a prior art compressor;

FIG. 3 is an exploded perspective view of the sealing and valving assembly of the air compressor of FIG.

FIGS. 4 is a plan view of a prior art cylinder flange;

FIG. 5 is a plan view of a prior art cylinder gasket;

FIG. 6 is a plan view of a prior art intake reed valve;

FIG. 7 is a bottom plan view of a prior art compressor valve plate;

FIG. 8 is a top plan view of prior art exhaust reed valve;

FIG. 9 is a top plan view of a prior art limiter plate;

FIG. 9A is a cross-sectional view taken substantially along line 9A—9A of FIG. 9;

FIG. 10 is a top plan view of a prior art head gasket;

FIG. 11 is a plan view of a prior art head flange;

FIG. 12 is a plan view of an intake reed valve in accordance with the present invention;

FIG. 12A is a cross-sectional view taken along line 12A—12A of FIG. 12;

FIG. 13 is a bottom plan view of an exhaust reed valve, of the present invention in an intermediate stage of manufacture;

FIG. 13A is a cross-sectional view taken substantially along line 13A—13A of FIG. 13;

FIG. 14 is a bottom plan view of a finished exhaust reed valve as formed from the intermediate shown in FIG. 13;

FIG. 14A is a cross-sectional view taken substantially along line 14A—14A of FIG. 14; and FIG. 14B is a fragmentary front view seen from the perspective of 14B—14B of FIG. 14.

DETAILED DESCRIPTION OF THE PREFERRED EMBODIMENTS

Referring now to the drawings, a typical air compressor 10 in accordance with the present invention as shown in FIGS. 1, 3 and 12–14B includes a cylinder 20, a piston 22, a head 24 and a valving and sealing assembly 26 sealingly connecting the cylinder to the head. In operation air is admitted to the cylinder through head intake port 27, is compressed therein, and is discharged as through head discharge port 28, typically into a reservoir or holding tank from which it is withdrawn on demand.

A prior art valving and sealing assembly is shown in FIGS. 2 and 4 to 11. As there seen a cylinder gasket 100 lies against the end flange 21 of the cylinder 20. Gasket 100 may be a typical elastomer bound fibrous material. Like the remainder of the elements, gasket 100 defines corner bolt holes B for orienting and clamping the sealing assembly together. An intake flap or reed valve 110 is juxtaposed therewith. Reed valve 110 comprises a spring steel plate, as of tempered stainless steel, and is configured to provide an integrally formed reed or flap 112 to permit air to enter the cylinder on the intake stroke and to prevent the escape of air during the compression stroke of piston 22.

Immediately above reed valve 110 is the orifice plate 120. Orifice plate 120 is generally planer or flat and may be formed of steel or aluminum. Orifice plate 120 defines a series of orifices or openings, including a pair of intake orifices 122 and a pair of exhaust orifices 124. The major surfaces 126 (one of which is fully shown in FIG. 7) of the orifice plate 120, are ground smooth and flat so that when the associated reed valves lie thereagainst, they substantially seal against the passage of air through the orifices. It will also be seen in FIG. 7 that the entryways to the exhaust orifices 124 are chamfered to reduce resistance to air flow as it enters the orifices 124 during the exhaust stroke. The entryways to orifices 122 from the other major surface 126 of plate 120 are similarly chamfered for the same reason.

Next a further reed valve 130 is disposed against the other flat major face of orifice plate 120. Reed valve 130 defines a pair of integral fingers or reeds 132 which will seal orifices 124 against the escape of air therethrough during the intake stroke, but the free ends of which will flex away from orifices 124 when air is exhausted therethrough. Like valve 110, valve 130 is a spring steel plate, as of tempered stainless steel.

Because the air which is exhausted through orifices 124 is high pressure air, it is typically desirable to limit the range of movement of the ends of reeds 132. That also controls the rate of discharge of air therethrough. To that end, a limiter plate 140 is provided. Limiter plate 140 may be a carbon steel plate and is frequently rubber coated. It may be provided with sealing embossments 142 to enhance sealing against the head. Limiter members 144 overlie the reeds 132. Limiter members 144 limit the range of movement of the reeds 132 away from the confronting main surface 126 of valve plate 120. The limiter members 144 are typically coined or embossed out of the plane of the main body 146 of the limiter plate 140. (Restraint against excessive movement of the flap or reed 112 may also be provided, as by the flange 21 of the cylinder itself).

Finally, the sealing assembly employs an appropriately configured head gasket 150 (FIG. 10) which seals against the flange of head 24. Sealing is enhanced by the embossment 142. Head 24 defines two zones, each sealed from the other. One zone (section I) allows air to be drawn into the cylinder, as through port 27, during the intake or suction stroke. The other zone (section E) allows compressed air to be discharged or exhausted from the cylinder, as through port 28, during the compression and exhaust stroke. On the intake stroke, the reed 112 opens to allow air to pass through orifices 122 while the reeds 132 seal against the surface of orifice plate 120 to prevent the escape of compressed air. During the discharge stroke, reed 112 seals against orifice plate 120 to prevent the loss of compressed air through the intake orifice, and the reeds 132 open to allow the compressed air to pass through the exhaust orifices 124 in orifice plate 120, into head 24 and into the reservoir for use.

It is known that as air is compressed it heats up. As such the components and sealing materials used and the rubber coatings used must accommodate to elevated temperatures without losing their sealing characteristics.

In accordance with the present invention, an improved valving and sealing assembly having fewer parts and improved sealing characteristics is provided. In particular, it has been discovered that the gaskets sealing against the head and cylinder can be eliminated as separate elements by combining them with the reed valves without losing the sealing characteristics necessary for the reeds to seal against the orifice plate surfaces 126. Further, it has been discovered that the limiter plates can be eliminated as separate elements uniquely by combining their function with the reed valve plate itself. Thus, the valving and sealing assembly, which in typical prior art compressors required six elements, may be reduced to as few as three elements requiring assembly with the head and cylinder.

Referring now to FIGS. 2 and 12 to 14B, an intake reed valve 200 may comprise a spring steel stainless plate 210 laminated with a sealing layer 212, such as of expanded graphite which provides good sealing and good heat dissipation characteristics. A suitable graphite layer is a compressed expanded graphite available from Union Carbide as Grafoil GT"Y" and GT"C". Plate 210 may be 0.008 inch thick. Layer 212 may be about 0.003 or 0.005 inch thick. The layer 212 will seal against a cylinder flange 21. Additionally a second sealing layer 214 as of expanded graphite may be laminated to the other surface of steel plate 210 to bear against the confronting surface of the orifice plate which may be the same as orifice plate 120. It has been determined that the graphite layer 214 as borne by the reed 216, will not only provide the requisite seal against the confronting orifice plate surface 126 during compression, but will provide a sound deadening effect as well. It is known that the repeated slapping of a reed, such as reed 112, against the surface of a confronting orifice plate increases the sound level of a typical compressor. This component of the noise produced during operation of a compressor will thus be reduced by the provision of layer 214 on the reed 216.

Referring now to FIGS. 14 to 14B, the exhaust reed valve 230 has been designed to provide multiple functions. First, reed valve 230 includes a pair of fingers or reeds 32. Reeds 232 function to seal against the surface of the associated orifice plate during the intake stroke and to move away from the exhaust orifices in the orifice plate during the exhaust stroke. Reed valve 232 also provides integrally formed limiters 234.

FIG. 13 illustrates an exhaust reed valve plate blank 230A at an intermediate stage of manufacture. It comprises a main body 258 defining an opening 250 corresponding to the intake opening in the head, and a pair of reeds 232 bordered by a punched-through slot so that the free ends of the reeds will move freely in and out of the plane of the main body 258 as necessary. In the zone of the exhaust, and adjacent to the free ends of the reeds 232, the main body is punched to provide clear through slits along lines 252, 253 and 254. When limiters 234 are to be formed, that is accomplished by folding them rearwardly along fold lines 255 until they underlie and are generally parallel with the reeds 232. During the forming process the central zones of limiters 234 are preferably embossed or coined out of the plane of the main body 258 so that the limiter portions 234 underlying the reeds 232 (as seen in FIGS. 14A and 14B), will be spaced away a predetermined amount, to control the distance which the free ends of the reeds may move to permit exhaust air to pass thereby (see FIGS. 14 to 14B), generally to the same extent permitted by prior art limiters.

Finally, the outer surface of the main body 258 may be provided with a facing layer 270 such as expanded graphite which will seal against the head 24 and which will resist the elevated temperatures of the exhaust air. The facing may be applied prior to forming of the limiters. In any event, the exhaust reed valve plate will then serve the function of three elements previously required, namely the reed plate, the limiter plate, and the head gasket. It may also be desirable to provide a facing 272 on the other side of the reed valve plate so that the layered reeds will provide a sound deadening function in the same manner described regarding intake reed valve plate 200.

It will be apparent that the improved reed valve plates of the present invention may be used in lieu of those of the prior art, but may be otherwise similarly configured in plan view so that they can be used, for example, with the same orifice plates and in the same compressors, simply eliminating the need for the prior art reed valves, gaskets and limiter plates, while achieving improved performance.

Thus, it will be clear that the improved valving and sealing assembly of the present invention has fewer elements to assemble to provide effective sealing of the head to the cylinder, while providing effective valving of the air on the intake and exhaust strokes, and also to provide less noise in operation, substantial environmental improvements.

Although the invention has been described in the context of an air compressor, it will be apparent to those skilled in the art that there are other well-known environments in which flapper or reed valves may similarly benefit from the practice of the present invention. Such other uses include refrigeration and air conditioning, air and freon compressors, small 2-cycle internal combustion engines, gas compressors, vacuum pumps, heat pumps, freon recovery systems, etc. These and other uses as well as modifications in the embodiment illustrated and described herein will be apparent to those of ordinary skill in the art from the foregoing.

Accordingly, the invention is not intended to be limited by the foregoing description of the presently preferred embodiment, but only as may be made necessary by the appended claims.

What is claimed is:

1. A valve assembly comprising an expansive, generally flat orifice plate defining an orifice passing therethrough, a confronting expansive, generally flat reed valve plate lying generally in a single plane and defining a reed formed at one end with said reed valve plate and having a free end, said free end being moveable into and out of the plane of the reed valve plate and toward and away from said orifice plate to open and close said orifice, and an expanded graphite gasketing layer laminated to said reed valve plate for providing a seal.

2. A valve assembly in accordance with claim 1, and wherein said gasketing layer confronts said orifice plate to seal against said orifice plate and to reduce the noise produced by contact of said reed with said orifice plate.

3. A valve assembly comprising an expansive, generally flat orifice plate defining an orifice passing therethrough, a confronting expansive, generally flat reed valve plate lying generally in a single plane and defining a reed formed at one end with said reed valve plate and having a free end, said free end being moveable into and out of the plane of the reed valve plate and toward and away from said orifice plate to open and close said orifice, a gasketing layer laminated to said reed valve plate for providing a seal, and wherein said valve assembly is disposed in a compressor between a compressor head and a compressor cylinder.

4. A valve assembly in accordance with claim 3, and wherein said gasketing layer faces away from said orifice plate and seals against one of said compressor head and said compressor cylinder.

5. A valve assembly in accordance with claim 3, and wherein a said gasketing layer is laminated to each of the expansive surfaces of said reed valve plate.

6. A valve assembly in accordance with claim 3, and wherein said reed valve plate is an exhaust valve plate and said gasketing layer is laminated to the expansive surface of said reed valve which confronts said compressor head.

7. A valve assembly in accordance with claim 3, and wherein said reed valve plate defines a limiter portion integral therewith which overlies said reed to limit movement of said free end out of the plane of said reed valve plate.

8. A reed valve plate comprising a generally flat main body and defining a reed valve formed with said plate at one end and having a free end adapted to move out of the plane of said reed valve plate, and a limiter overlying said free end for limiting the distance said free end may move out of the plane of said reed valve plate, said limiter being integrally formed with said reed valve plate and being folded relative to said main body to overlie and to be spaced from said free end.

9. The reed valve plate of claim 8, and wherein said main body defines at least two reed valves formed with said reed valve plate at one end of each and each having a free end, and a limiter overlying each free end, each said limiter being integrally formed with said reed valve plate and being folded relative to said reed valve plate to overlie its associated free end.

10. The reed valve plate of claim 8, and further comprising a gasketing layer laminated to said reed valve plate and adapted for sealing said reed valve plate to a compressor head.

11. An air compressor having a head and a cylinder and a sealing and valving assembly therebetween, said sealing and valving assembly comprising an expansive, generally flat orifice plate defining orifices passing therethrough and having two major surfaces, an expansive, generally flat reed valve plate confronting one of the major surfaces of said orifice plate and lying generally in a single plane and defining a reed formed at one end with said reed valve plate and having a free end, said free end being moveable into and out of the plane of the reed valve plate and toward and away from said orifice plate to open and close an orifice, and a generally flat second reed valve plate confronting the other of said major surfaces and defining an integral second reed having a free end moveable into and out of the plane of the second reed valve plate to open and close a second orifice, and a gasketing layer laminated to one of said first and second reed valve plates for providing a seal against one of said cylinder and said head.

12. The air compressor of claim 11 and wherein said second reed valve plate defines an integral formed limiter portion overlying said second reed for limiting the distance the free end of the second reed may move out of the plane of said second reed valve plate and away from said orifice plate.

13. The air compressor of claim 12, and wherein said second reed valve plate defines at least two second reeds formed with said second reed valve plate, each having a free end, and a said limiter portion overlying each of said second free ends.

14. The air compressor claim 11, and further including a second gasketing layer laminated to the other of said first and second reed valve plates for providing a seal against the other of said cylinder and said head.

15. The air compressor of claim 11, and wherein a further gasketing layer is laminated to the surface of one of said reed valve plates which confronts a major surface of said orifice plate.

\* \* \* \* \*

UNITED STATES PATENT AND TRADEMARK OFFICE
CERTIFICATE OF CORRECTION

PATENT NO. : 5,454,397
DATED : October 3, 1995
INVENTOR(S) : Frank L. Miszczak

It is certified that error appears in the above-indentified patent and that said Letters Patent is hereby corrected as shown below:

Column 2, line 46, wording should be "valving assembly of the air compressor of FIG. 1;"

Column 4, line 66, the reference to "reeds" should be --reeds 232--.

Signed and Sealed this

Seventh Day of May, 1996

*Attest:*

BRUCE LEHMAN

*Attesting Officer*   *Commissioner of Patents and Trademarks*